INVENTOR
WERNER SCHIEBELER

BY Percy P. Lantzy
ATTORNEY

INVENTOR
WERNER SCHIEBELER

BY [signature]
ATTORNEY

INVENTOR.
WERNER SCHIEBELER

Transistor blocked = 0
Transistor unblocked= 1

| Number decadic | Flip-Flop 24 | | 25 | | 26 | | Step and sensing | |
|---|---|---|---|---|---|---|---|---|
| | T36 | T37 | T38 | T39 | T40 | T41 | | |
| 0 | 1 | 0 | 1 | 0 | 1 | 0 | Stop | (Only available if transmitted via continuous key, is otherwise being skipped) |
| 1 | 0 | 1 | 1 | 0 | 1 | 0 | Stop | |
| 2 | 1 | 0 | 0 | 1 | 1 | 0 | Start | |
| 3 | 0 | 1 | 0 | 1 | 1 | 0 | 1 | |
| 4 | 1 | 0 | 1 | 0 | 0 | 1 | 2 | |
| 5 | 0 | 1 | 1 | 0 | 0 | 1 | 3 | |
| 6 | 1 | 0 | 0 | 1 | 0 | 1 | 4 | |
| 7 | 0 | 1 | 0 | 1 | 0 | 1 | 5 | |

Fig. 2

INVENTOR
WERNER SCHIEBELER

BY Percy P. Lantzy
ATTORNEY

INVENTOR
WERNER SCHIEBELER
BY Percy P. Lantzy
ATTORNEY

INVENTOR
WERNER SCHIEBELER

United States Patent Office 3,437,744

Patented Apr. 8, 1969

3,437,744

ELECTRONIC TELEPRINTER TRANSMITTING AND RECEIVING SYSTEM

Werner Schiebeler, Eutingen, Baden, Germany, assignor to International Standard Electric Corporation, New York, N.Y., a corporation of Delaware Filed Mar. 9, 1965, Ser. No. 438,206
Claims priority, application Germany, Mar. 14, 1964, St 21,839
Int. Cl. H04l 15/00, 15/18, 15/24
U.S. Cl. 178—2 9 Claims

ABSTRACT OF THE DISCLOSURE

A transmit/receive system for semi-electronic teleprinters in which the same groups of components are used for receiving as well as the transmitting, and to supervise the coincidence of a fed-in element with the element actually transmitted over the telegraph line, the system operates as a transmitter during the first half of a signal element and is switched over to operate as a partial receiver during the second half of the signal element to scan the telegraph line.

The present invention relates to a transmitting and receiving system for electronic printing telegraph apparatus which is required for receiving teleprinter signals arriving in series via one telegraph line.

The applicant has already proposed an arrangement which substantially serves the regeneration of teleprinter signals in his application Ser. No. 411,419, filed Nov. 16, 1964, in which the reception and the retransmission of the signals are coupled to one another, and are effected via different lines.

The characteristic feature of this arrangement according to the earlier proposal resides in the fact that the substantial electric component groups serve the reception as well as the retransmission of the teleprinter signals.

The present invention provides a transceiving system for a semi-electronic type of teleprinter which is based on the principle of the double utilization of the substantial electric component groups for both the reception and the retransmission of teleprinter signals. Moreover, the invention provides a semi-electronic teleprinter in which the incoming and the outgoing signals are transmitted on one and the same line at different times and independently of one another. In this teleprinter, according to a further embodiment of the invention, by utilizing the existing component groups, it is determined with the aid of an additional supervisory stage whether the signal (character) printed as the result of depressing a key, actually corresponds to the signal transmitted over the line.

At the reception of teleprinter signals the five signal elements are led in the usual way to five storage flip-flops and, via the setting of five selecting magnets, initiate the printing to be effected by the connected mechanical printing mechanism. The necessary switch-over operations between transmitting and receiving are carried out by a directional stage.

Figure 1:
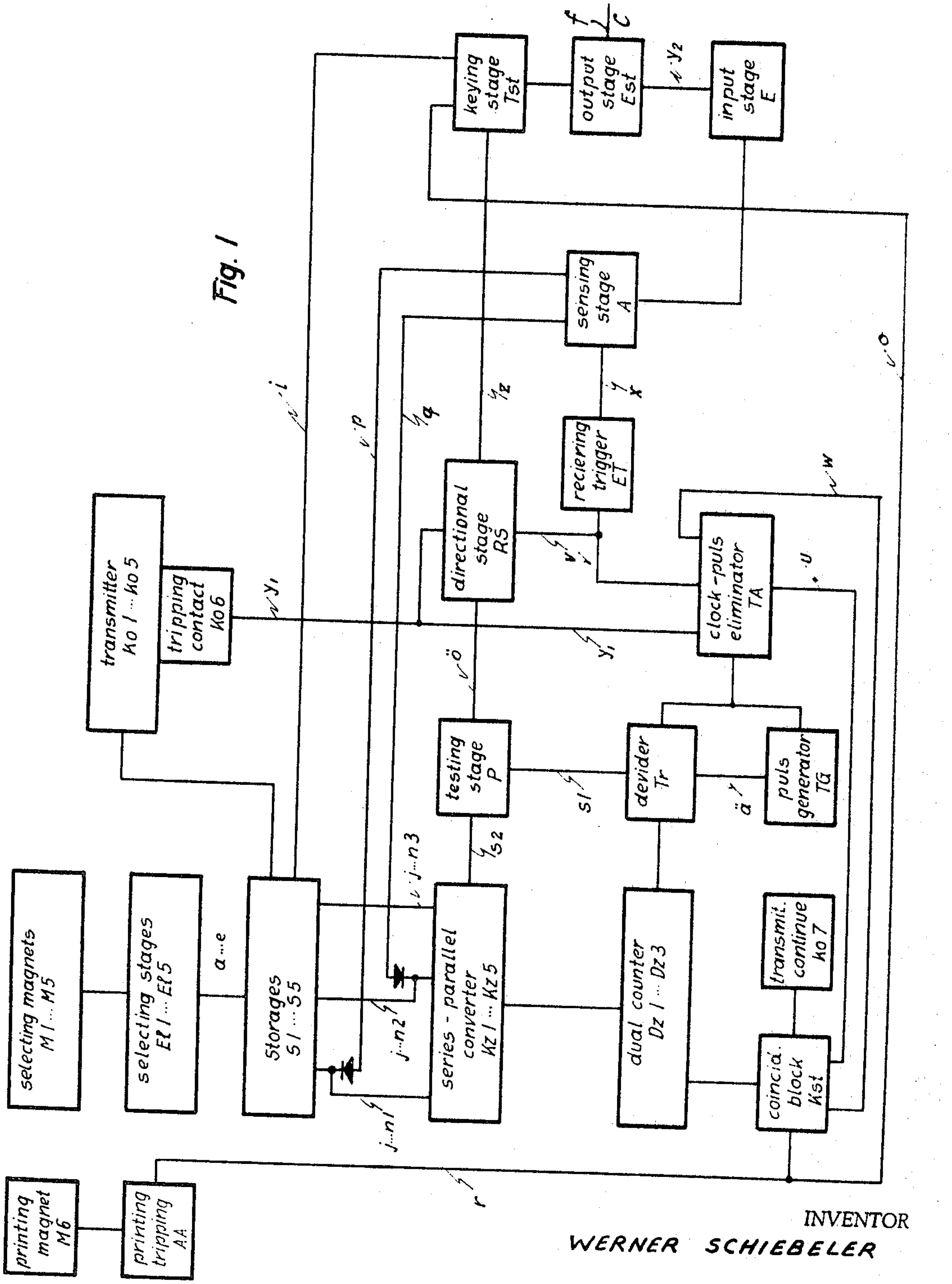
Figure 1A:
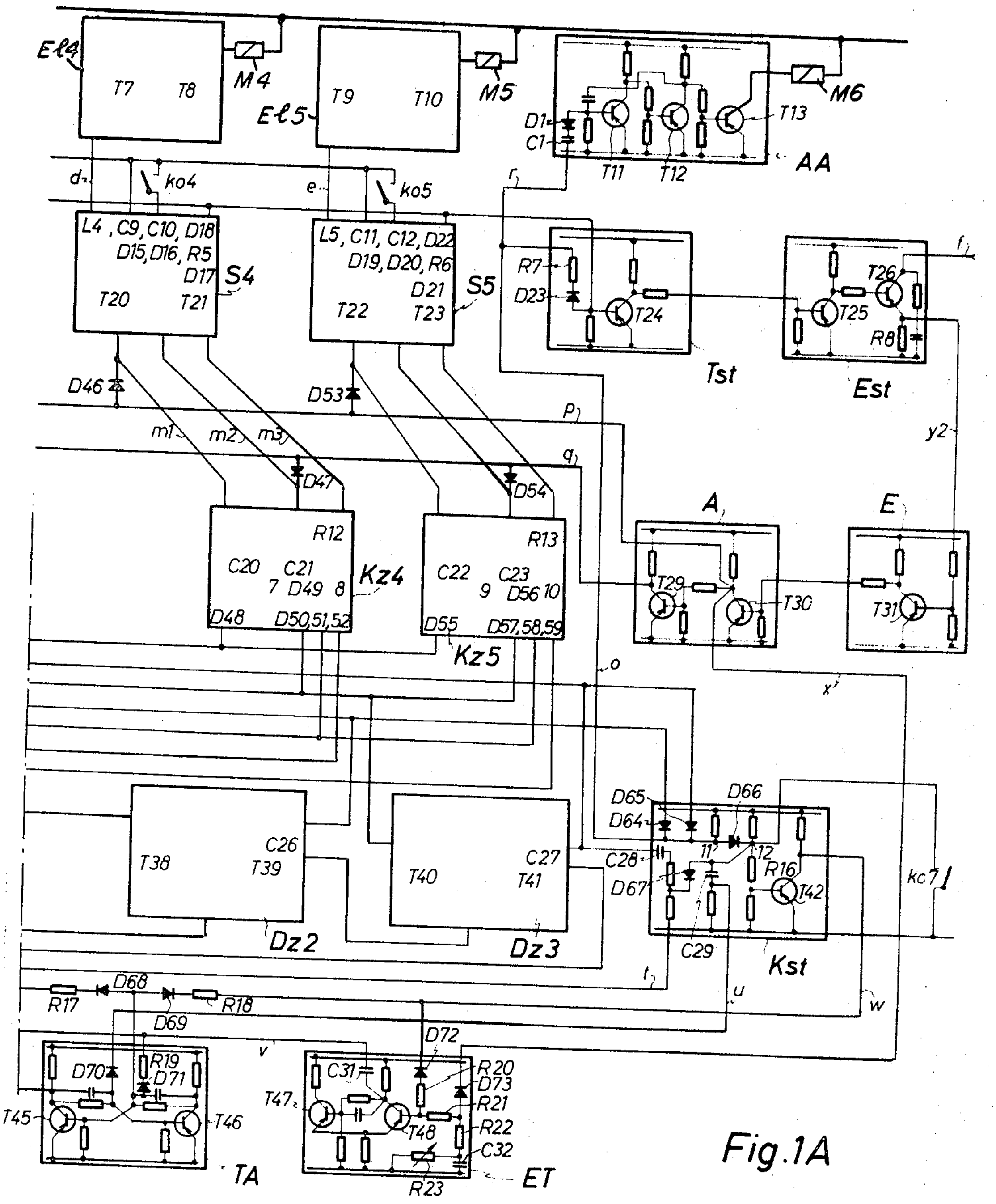
Figure 1B:
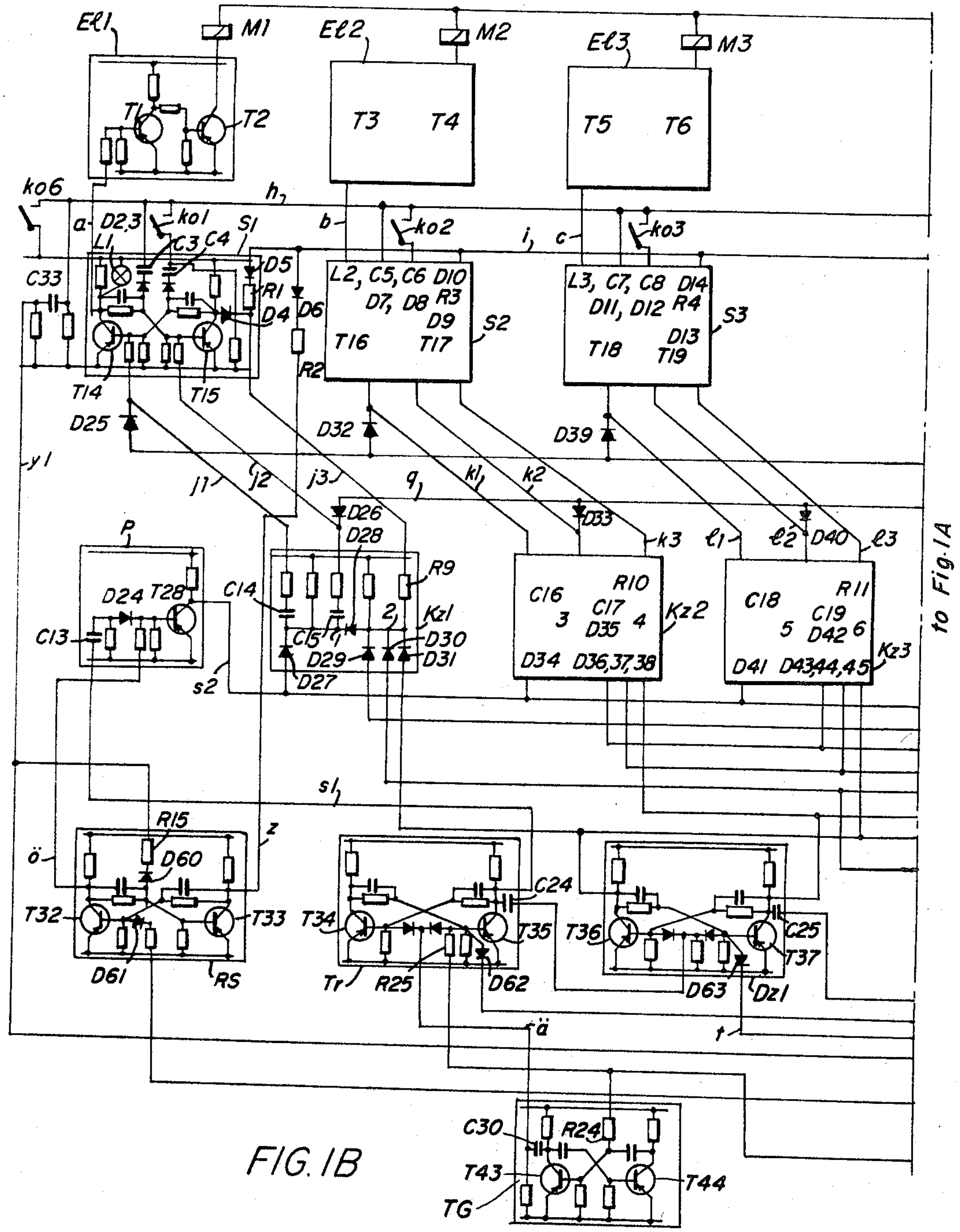

The invention will now be explained in detail with reference to FIGS. 1 to 4 of the accompanying drawings. FIG. 1 shows a schematic block diagram which, for the purpose of providing a better understanding, is restricted to the most substantial features the representation in the block diagrams of FIGS. 1A and 1B show details of the circuitry. The receiving stage of the circuit arrangement comprises the input stage E, the sensing stage A, the receiving trigger ET, the clock-pulse eliminator TA, the clock-pulse generator TG, the series-parallel converter Kz1–Kz5, Dz1–Dz3, and the storages S1–S5. These components correspond in both construction and mode of operation to the receiving system for electronic teleprinters as disclosed by U.S. Patent No. 3,294,908, issued to Werner Schiebeler on Dec. 27, 1966, and to the electronic receiving and transmitting system for teleprinter signals employing a signal generation as described in application Ser. No. 411,419.

The transmitter (sender) of the present circuit arrangement uses most of the same functional groups as the receiving part, viz the timing-pulse eliminator TA, the timing-pulse generator TG, the parallel to serial converter Kz1–Kz5, Dz1–Dz3, and the storages S1–S5. Moreover, the transmitting part includes the keying stage T*st* and the output stage E*st*. In addition thereto, it includes the directional stage RS and the testing stage P which are to be regarded as connecting links between the transmitting and the receiving stage.

The five electromagnets M1–M5 are either energized or not energized by the electronic receiving system via the storages S1 through S5 in accordance with the received teleprinter signals. These five electromagnets, hereinafter referred to as selecting magnets, effect the setting of five code bars of a conventional mechanical printing element to release the type bar associated with the received teleprinter signal combination. The mechanical impact of this type bar is then triggered or released by the sixth electro-magnet M6 which is energized subsequently to the setting or selection of the code bars.

The transmitter keyboard mechanically acts upon the five transmitter contacts *ko*1 to *ko*5. By the touch of a finger to the key of a conventional transmitter keyboard the key lever displaces five selector bars which, in turn, effect the setting of the five transmitter contacts *ko*1 to *ko*5 in accordance with the pulse or signal combination of the teleprinter signal to be transmitted. Then the transmitting contact is closed when the associated signal pulse is to become a space-mark signal. At the same time, or shortly prior to the setting of the transmitting contacts *ko*1 to *ko*5, the tripping contact *ko*6 is actuated. By this contact *ko*6 there is initiated the electronic transmission of the teleprinter signal.

Figure 3:
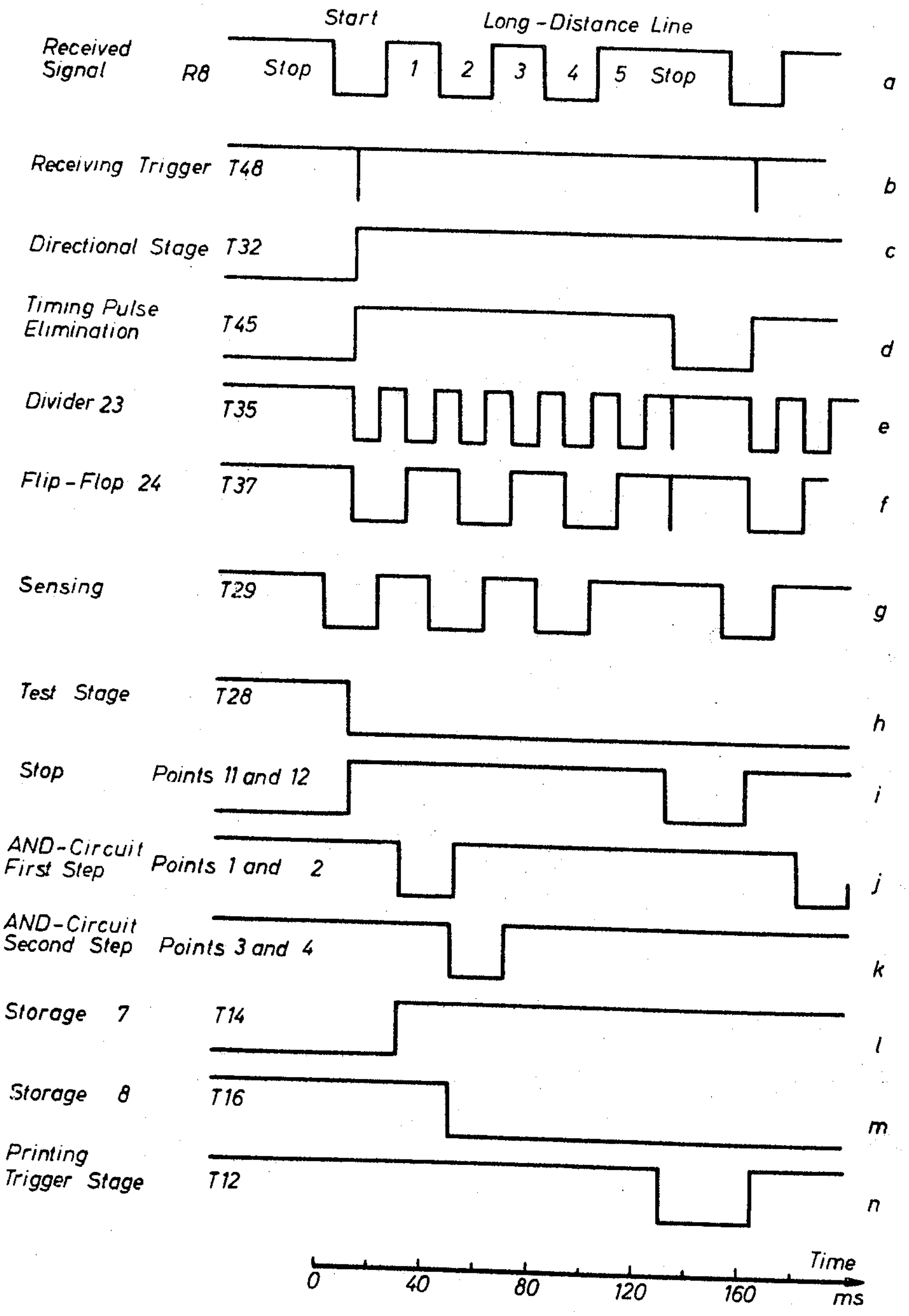

If a keyed-in signal is to be transmitted continuously, there must be depression of the continuous key of contact *ko*7. As long as the contact *ko*7 is closed, there is effected a continuous transmission of the signal which was the last one to be stored into the circuit arrangement via the transmitting contacts *ko*1 to *ko*5. The mode of operation of the circuit arrangement will now be explained in detail with reference to and in connection with FIGS. 1 to 4 of the accompanying drawings, wherein pulse diagram of FIG. 3 shows the various circuit conditions of the most substantial functional blocks.

In the initial position it is assumed that at the last a teleprinter signal was transmitted over the telepriner line *f* and that now, after an interval, and via the same line, there is received a teleprinter signal. Prior to this reception a continuous (line) current of 40 ma. flows on the teleprinter line *f*, which is maintained by a not shown source of voltage (120 volts), and by a series resistance of 3 kilohms. The line current flows through the conducting transistor T26 of the output stage E*st*, and across the resistor R8. The voltage drop occurring across this resistor keeps the transistor T31 of the input stage E on via the line *y*2, and keeps the transistor T30 in the off condition. From the collector electrode of transistor T30, and via the line *x* the receiving trigger ET is maintained in the circuit condition in which the transistor T48 is conducting and in which the transistor T47 is non-conducting.

Upon reception of a teleprinter signal via the teleprinter line (see FIG. 3*a*) the line current is first of all interrupted by the start element for a period of time of 20 ms. (at 50 bauds). Now the negative voltage at R8 disappears, the transistor T31 is non-conducting, and the transistor T30 is conducting. The transistor T48 of the receiving trigger ET, however, is now still kept in the conducting state by the discharge current of the capacitor C32. The capacitor C32 is discharged across R22, R21 and the base electrode path of the transistor T48 and via the potentiometer R23. This potentiometer is assumed to be adjusted so that after 10 ms. the discharge of the capacitor C32 has proceeded to such an extent that the receiving trigger ET will be reversed and the transistor T48 is non-conducting, and the transistor T47 is conducting (FIG. 3*b*). The negative voltage jump at the collector electrode of transistor T48 is conducted via C31, the line *v* and the diode D61, to the base electrode of transistor C30 of the directional stage RS. Transistor T32 which has previously been assumed as being non-conducting is now conducting (FIG. 3*c*) and the transistor T33 becomes non-conducting. Via the line *z*, extending from the collector electrode of transistor T33, as well as via R2, D6, and the line *i*, transistor T24 of the keying stage T*st* is kept in the conducting condition. Therefore, in the output stage, E*st* 25 is kept non-conducting, and T26 is kept conducting. In this manner the output stage transistor T26 does not affect the signal reception. Moreover, by the conduction of transistor T32 of the directional stage RS, the line *ö* becomes currentless so that the transistor T28 of the testing stage P will be non-conducting.

Due to the reversal of the receiving trigger ET, a negative pulse is applied via the line *v*, R19, and D71, to the base electrode of the transistor T45 of the timing-pulse eliminator TA. This flip-flop reverses and the transistor T45 conducts (FIG. 3*d*). Then both the clock- or timing-pulse generator TG and the divider T*r* will no longer be held off via R24 and R25, and the clock- or timing-pulse generator TG will start to oscillate freely.

With respect to the timing pulse generator TG, a simple type of multivibrator has been shown. However, it is unsuitable for practical application, because the duration of period of its first oscillation does not correspond exactly enough to the duration of period of the follwing oscillations. Instead of the multivibrator, therefore, it might be advantageous to use a timing-pulse generator TG of the kind as described in the U.S. Patent No. 3,294,908, and in application Ser. No. 411,419, which are also known as sine-wave quartz-crystal, or multivibrator oscillators.

The timing-pulse generator TG starts its oscillations so that the transistor T43 is non-conducting, and the transistor T44 is conducting. Via the capacitor C30 and the line *ä* a negative pulse is fed to the divider T*r* This divider reverses, in that the transistor T34 is conducting, and the transistor T35 is non-conducting (FIG. 3*e*). The negative pulse as derived via C24, from the collector electrode of the transistor T35, is fed to the dual counter D*z*1 to D*z*3. This three-stage dual counter forming part of the series-parallel converter has assumed in the hitherto normal condition a position which is referred to as decadic 1 (=stop) in the table shown in FIG. 2. By the first negative stepping pulse via C24, the dual counter D*z*1 to D*z*3 is switched into position 2 (=start) of FIG. 2. (FIG. 3*f*). Connected to the dual counter D*z*1–D*z*3 are the six coincidence circuits K*z*1–K*z*5 and K*st*, designed to effect the scanning of six of the seven or eight stable conditions of the dual counter. Via the capacitors C14 to C23, these coincidence circuits effect the erase and the storing into the flips-flops S1 to S5 during the signal reception, and effect the forming of the teleprinter signals in the event of transmission.

When the dual counter D*z*1 to D*z*3 has been switched into position 2, there is removed the coincidence at the diodes D64, D65 of the block K*st*. However, since no coincidence circuit is provided for position 2, no further special processes are being performed at the moment in the circuit arrangement.

The timing-pulse generator TG which, at a telegraph speed of 50 bauds, oscillates at a frequency of 100 c.p.s., supplies after 10 ms. a further stepping pulse to the divider T*r* via the line *ä*. The divider is caused to reverse, so that the transistor T35 will conduct. This process is repeated after 10 ms. The divider Tr is again reversed, and the transistor T35 is non-conducting. A setting pulse is only applied to the dual counter D*z*1 to D*z*3 upon conduction of the transistor T35, so that the counter is switched from position 2 into position 3 (=first element). At points 1 and 2 in the coincidence circuit K*z*1 there is produced a negative voltage (FIG. 3*j*).

Meanwhile the first "mark"-element or signal pulse has arrived over the telegraph line *f* (FIG. 3*a*). Then the transistors T31 and T29 conduct, and the transistor T30 is non-conducting. Both transistors T29 and T30 in block A serve the pulse scanning in that they alternately apply either the line *p* or the line *q* to ground or plus potential. In the present case the line *q* is applied to ground potential. The occurrence of the coincidence event in block K*z*1 now effects one negative pulse each via C14 and C15. However, since the pulse is led behind C15 and via the diode D26 and the line *q* to ground, the pulse from C14 is applied to the base electrode of transistor T14 of the storage flip-flop S1. This flip-flop is caused to reverse, the transistor T14 conducts, the lamp L1 is switched on, and indicates the storing-in of a "mark" pulse (FIG. 31). In accordance with this storing there is also controlled the selecting magnet M1. Via the line *f* there is effected the non-conducting of T1 and the conducting of T2, so that now current is allowed to flow through the magnet M1.

After a period of 20 ms. the dual counter D*z*1 to D*z*2 will receive a further stepping pulse via D24, so that it will be switched into position 4 (=second element) as shown in FIG. 2. The negative voltage at the coincidence circuit K*z*1 will disappear, and will appear instead at the coincidence circuit K*z*2 (FIG. 3*k*).

Meanwhile, the second "space" element has arrived over the telegraph line *f* (FIG. 3*a*). In block A the transistor T30 conducts, and transistor T29 is non-conducting. Accordingly, the line *p* is applied to ground or plus potential. The negative voltage at points 4 and 3 in block K*z*2 produces negative pulses behind the capacitors C16 and C17, of which the pulse behind the capacitor C16 (and the diode D32) is led via D32 and the line *b*, to ground. The pulse via C17 is not led off, and is applied to the base electrode of transistor T17 of the second storage flip-flop S2. Since this flip-flop S2 was previously assumed as being marked, it is now erased (FIG. 3*m*), in that T17 conducts, T16 is non-conducting, and the lamp L2 is switched-off. At the same time, via the line *b* and via the transistors T3 and T4, the selecting magnet M2 is de-energized. Now, the reception of the second signal element is completed.

The three remaining signal elements are received in an analogous way. Upon reception of the fifth signal element *a* switching is performed by the dual counter D*z*1 to D*z*2 from position 7 to position 0 (FIG. 2), and transistor T41 of the flip-flop D*z*3 is non-conducting. From the collector electrode of this transistor, and with the aid of C28, a negative pulse is coupled, via the line *t* and the diode D63, to the base electrode of transistor T37 in the flip-flop D*z*1. Than there is effected the conduction of transistor T37 which was non-conducting prior thereto, and the dual counter D*z*1 to D*z*3 is thus switched from position 0 to position 1. At points 11 and 12 of the coincidence circuit K*st* there is produced a negative voltage. Via the capacitor C29 this voltage is taken off as a negative pulse and is fed via the line *u*, to the base electrode of transistor T46 of the timing-pulse eliminator TA. This flip-flop stage TA is reversed, and the transistor T45 is non-conducting (FIG. 3*d*). Via the resistors R24 and R25 both the timing-pulse generator TG and the divider T*r* are prevented from performing further oscillations or reversals, and are switched off, while T43 and T35 are maintained in the conducting state. Accordingly there is completed the reception of a complete teleprinter signal, and if further teleprinter signals follow, the described processes are repeated.

After an interval, the circuit arrangement is able to transmit a teleprinter signal. Therefore, one of the keys of the transmitter keyboard must be depressed for actuating the contacts *ko*1 to *ko*6, and for selecting or adjusting them in accordance with the necessary pulse combination.

Figure 4:
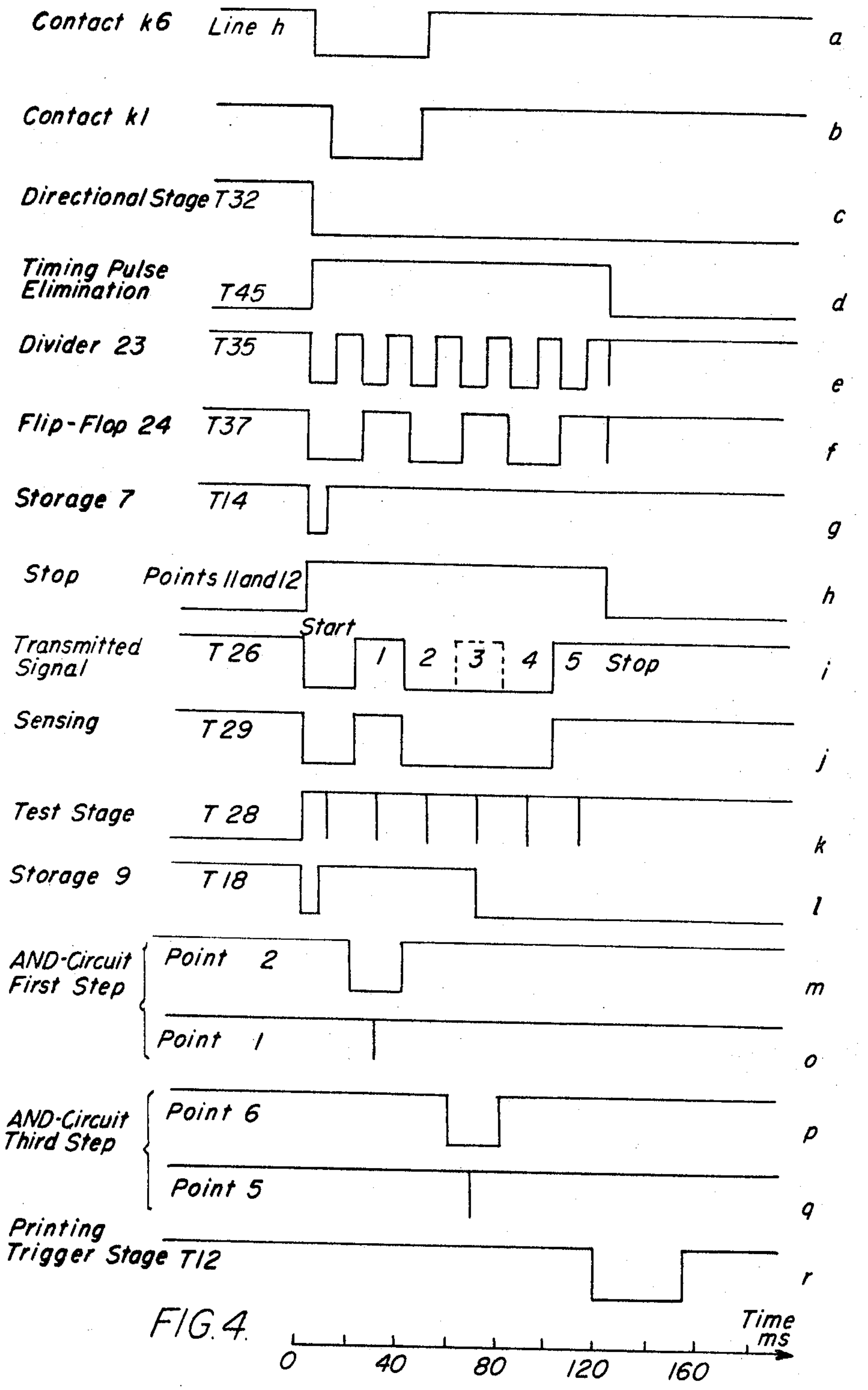

It be assumed that the signal to be transmitted corresponds to the character Y (with the first, third, and fifth elements being "mark" elements). Consequently, the transmitting contacts *ko*1, *ko*3, *ko*5 are closed, while the transmitting contacts *ko*2 and *ko*4 remain open. Prior to or simultaneously with the actuation of the contacts *ko*1, *ko*3, and *ko*5 there is closed the tripping contact *ko*6 (FIGS. 4, 2). By the closing of this contact *ko*6 a negative voltage is applied to the line *h*. Via the capacitor C3, C5, C7, C9, C11 there is effected the erase of the storage flip-flops S1 through S5. Then the transistors T14, T16, T18, T20, T22 are non-conducting, and the lamps L1 to L5 are extinguished. The closing of the transmitting contact *ko*1 effects that a negative pulse will mark the storage flip-flop S1 via C4, in the course of which the transistor T14 is unblocked, thus causing the lamp L1 to be lit. The capacitor C4, with respect to the capacitor C3, is so dimensioned (for example, double the capacity of C3) so that the pulse via C4 will also predominate in cases where the contacts *ko*6 and *ko*1 are actuated simultaneously or when the contact *ko*6 is actuated later. The same applies to the dimensioning of the capacitors C5 to C12, and to the processes performed during the actuation of the transmitting contacts *ko*3 to *ko*5.

Moreover, upon closing of the tripping contact *ko*6, a negative pulse is applied via C33, the line *y*1, the resistor R15 and the diode D60, to the directional stage RS, and another negative pulse is applied to the timing-pulse eliminator TA via R17 and D68. Both of the flip-flop stages are reversed, in the course of which the transistors T33 and T45 are made conducting (FIG. 4, *d*). The directional stage RS, from the non-conducting transistor T32, keeps the transistor T28 of the testing stage P in the conducting state via the line *ö*. This causes, via the line *s*2, the points 1, 3, 5, 7, 9 in the coincidence circuits K*z*1 to K*z*5 to be connected to chassis ground. For this reason, the latter are first of all rendered inoperative with respect to their influence upon the storage flip-flops S1 to S5. The conduction of T33 of the directional stage RS causes the line *z* to become currentless, so that both the keying stage T*st* and the output stage E*st* are no longer non-conducting.

Subsequently to the reversal of the timing-pulse eliminator TA the timing-pulse generator TG, the divider T*r*, and the dual counter D*z*1 to D*z*3 operate in the same way as has already been described hereinbefore with respect to the signal reception. By the first stepping pulse extending from the divider T*r* via T24, the dual counter D*z*1 to D*z*3 (FIG. 2) is switched from position 1 (=stop) to position 2 (=start). Then there disappears the negative voltage in block K*st* at point 11, the line *o* is rendered currentless, and the transistor T24 of the keying stage *Tst* is no longer kept in the conducting state via R7 and D23'. The transistor T24 is non-conducting, transistor T25 is conducting and transistor T26 is non-conducting. The line current flowing on the telegraph line is interrupted, and in this way the start element is transmitted. At the same time, in the input stage E and in the scanning block A, the transistors T31 and T29 are non-conducting, while transistor T30 is being made conducting.

After a period of 20 ms. the dual counter is switched in the already described manner to position 3. At point 2 of the coincidence circuit K*z*1 there is produced a negative potential. Point 1, however, will first of all be connected to chassis ground via the conducting transistor T28. Across R9, via the line *j*, R1, D5, and the line *i* there will now flow a current to the base electrode of T24 of the keying stage T*st*. This current is not led off via D4 in the storage S1, because T15 has been made non-conducting in consequence of the actuation of the key of the manual keyboard (transmission of the character *y*). In consequence of the base current the transistor T24 is conducting; transistor T25 is non-conducting and T26 is conducting. Accordingly, a line current will again flow on the telegraph line *f*, and the first "mark" element will be transmitted. The voltage arising on account of the line current at R8 in the output stage E*st*, causes conduction of transistor T31 of the input stage E via the line *y*2. The transistor T30 is non-conducting, and transistor T29 is conducting. Accordingly the line *q* is applied to chassis ground, whereas the line *p* is applied to negative potential.

10 ms. after the beginning of the first signal element the divider T*r* is again reversed by a stepping pulse on line *ä* (FIG. 4*a*), in the course of which the transistor T35 is conducting. Via the line *s*1 and the capacitor C13, a positive pulse is taken off the collector electrode of the conducting transistor T35, and is applied to the base electrode of the transistor T28 of the test stage P. The transistor T28 is temporarily non-conducting (FIG. 4*k*) and is then kept in the conducting state via the line *ö*. A negative voltage will become temporarily effective at point 1 of the coincidence circuit K*z*1. Via the capacitors C14 and C15 this voltage causes negative pulses. Behind C15, however, the pulse is redirected via T26 and the line *q*, towards chassis ground, because the transistor T29 is conducting. The pulse via C14, however, is applied to the base electrode of transistor T14 of the storage device S1. There, however, the pulse is ineffective because the transistor T14 is already conducting. Accordingly, the circuit condition of the flip-flop S1 is not changed.

10 ms. later the transmission of the first signal element is completed. The dual counter effects the switching from position 3 to position 4 (FIG. 2). At point 4 of the coincidence circuit K*z*2 there is produced a negative voltage. The current resulting there from via R10 and the line *k*3, however, is redirected via D9 and the conducting transistor T17 of the storage flip-flop S2, towards chassis ground. The line *i* is thus rendered currentless, so that transistor T24 of the keying stage T*st* will become non-conducting. Likewise there is no conduction of the transistor T26 of the output stage E*st* and interruption of the line current. The second signal element becomes a "space" element. At *r*8 there is effected no voltage drop, thus causing the non-conduction of transistor T31 of the input stage E. In block A, transistor T30 is conducting, and transistor T29 is non-conducting. On account of this the line *q* is applied to −12 volts, and line *b* is applied to chassis ground.

If, 10 ms. later, the transistor T28 in the test stage P is temporarily non-conducting by a positive pulse arriving over C13 and D24, as has been described in analogy with respect to the first signal element, then the negative pulse arriving over C16, is redirected via D32 and line *p* to chassis ground; the pulse arriving over C17 (both in block K*z*2), however, is applied to the base electrode of transistor T17 in the storage flip-flop S2. This flip-flop is not affected, because transistor T17 was already conducting prior thereto. After another 10 ms. the transmission of the second signal element is completed.

The dual counter returns to position (FIG. 2), and with respect to the block K*z*3 there are met the coincidence requirements, so that a negative voltage will appear at point 6. The transmission of the third signal element which is supposed to become a "mark" element, is now initiated. Since in this case, transistor T19 in the storage S3 is non-conducting, the current flowing across R11 and via the line 13, is re-directed towards chassis ground via D13. In fact, it continues to flow via R4, D14, and the line *i* to the base electrode of transistor T24 of the keying stage T*st*. Transistor T24 is conducting, transistor T25 is non-conducting and transistor T26 is conducting.

Let use now assume that the transmission of this third "mark" element is being disturbed or prevented by a failure of some sort or other, for example, if the telegraph line *f* is temporarily interrupted, so that no line current is flowing through T26 and R8. In this case the transistor T31 of the input stage T*st* will not be conducting via the line *y*2. Then, transistor T30 conducts and transistor T29 is not conducting. The line *p* is applied to chassis ground, and the line *q* is applied to −12 volts. After 10 ms. the transistor T28 of the test stage T is temporarily non-conducting as described before. As a result of this a negative needle pulse will occur at point 5 of the coincidence circuit Kz3. This pulse which is transferred via C18 and the line *l*1, is re-directed to chassis ground via T39 and the line *p*. The pulse via C19 and the line 12, however, is applied to the base electrode of transistor T19 in the storage flip-flop S3. The transistor T19 conducts and, consequently, the flip-flop is reversed. It now assumes a different position than the one which was imprinted upon it at the beginning of the actuation of the transmitting contacts *ko*1 to *ko*6. The result of this will be, that after the effected, and as was assumed, faulty transmission of the teleprinter signal upon controlling of the printing tripping stage AA, a different character than the one originally depressed on the keyboard will be printed in accordance with the present invention.

After another 10 ms. hence altogether 80 ms. after the beginning of the signal transmission, there is completed the transmission of the third signal element (see FIG. 4). The dual counter switches from position 5 to position 6 (FIG. 2). At point 8 of the coincidence circuit Kz4 there is produced a negative voltage, and the transmission of the fourth signal element is initiated. The transmission of the fifth signal element is effected in the same way as has been described hereinbefore with respect to the first three signal elements.

Subsequently to the transmission of the fifth signal element the dual counter is reset from position 7, via position 0, to position 1 (FIGS. 2, 4*e* and *f*). At point 11 of the coincidence circuit K*st* there occurs a negative voltage which, via the line *o* and *i*, causes the transistor T24 of the keying stage T*st* to conduct and, consequently, also the transistor T26 of the output stage E*st*, so that on the telegraph line *f* there will be flowing the line current of the stop element. Moreover, via the line *r* and the capacitor C1, there is started the univibrator T11–T12 of the printing tripping stage AA. This univibrator is reversed, and for the time duration of its reversal, the transistors T11 and T13 are conducting, and the magnet M6 for the printing of the character, is energized. Together with the energization of the selecting magnets M1 to M5, this causes the printing of the character which has been transmitted by the output stage E*st*, and which has been checked by the input stage E and the scanning (or sensing) stage A.

Due to the negative voltage existing at points 11 and 12 of the coincidence circuit K*st*, the flip-flop TA of the timing-pulse eliminator is reversed via C29, the line *u*, and the diode D70, so that the timing-pulse generator TG ceases to oscillate. The whole system has completed one cycle, and has re-assumed its normal position.

As in the transmission of a single character there is also effected the continuous transmission of a character (letter). To accomplish this, the continuous-transmission key *ko*7 in addition to the block K*st* will have to be depressed. As long as this continuous-transmission key is depressed the character which was the last one to be stored into the storage flip-flop S1 to S5, will be permanently transmitted with 1.5 times the stop element. The processes deviating from what has been described hitherto, are as follows: By depressing the continuous transmission key *ko*7, the transistor T42 in block K*st* is non-conducting. The negative voltage occurring at its collector electrode will serve to cause conduction of the transistor T45 of the timing-pulse eliminator TA via the line *b*, R18, and D69, and will keep this transistor in the conducting condition as long as the contact of key *ko*7 is closed. The flip-flop TA is reversed, and the timing pulse generator TG starts to oscillate, so that now the signal transmission commences. The further processes are then performed as described hereinbefore with respect to the transmission of individual signals. Upon reaching the stop, however, the position 0 of the dual counter Dz1 to Dz3 will not be skipped (see FIG. 2) because the negative pulse otherwise effecting this skipping, is now re-directed via C28 and by the diode D67, to point 12 which is grounded via *ko*7. The flip-flop Dz1 accordingly, is not reset via the line *t*, but maintains its just assumed position for a period of 10 ms. The negative pulse as taken from the collector electrode of transistor T41 via C27, however, will remain unaffected, and still serves to reverse the divider Tr via D62. This pulse is responsible for effecting that the divider Tr will transmit a new stepping pulse after 10 ms., so that in this way there can be produced half a signal element of 10 ms.

A switching-off of the system via the line *u* and the flip-flop TA does not take place because point 12 is connected to chassis ground via the continuous-transmission key *ko*7, and is thus prevented from receiving a negative voltage. Only after the opening of *ko*7 and after the coincidence requirement has been met in the block K*st*, is the negative voltage occurring at point 12 capable of reversing the flip-flop TA of the timing-pulse eliminator via the capacitor C29 and the line *u*, thus resetting the system to normal.

It should be mentioned that this inventive type of circuit arrangement is in no way restricted to use in semi-electronic teleprinters only, but that it may be used quite generally. In particular it is not necessary to actuate mechanical contacts for effecting the transmission of a character (letter) instead, it is possible to connect the amplifies outputs of a photoelectric tape reading analyser. Likewise, for effecting the printing of a character or letter there is no need for connecting the selecting magnets because it is also possible to use electronic decoding devices for this purpose.

What is claimed is:

1. An electronic circuit arrangement for effecting reception and transmission of teleprinter signals comprising:
- a series-to-parallel converter including coincidence stages and a dual counter;
- a clock-pulse generator serving as a time base;
- a directional stage which determines the direction of intelligence flow;
- a frequency divider which steps-on said converter by dividing the frequency of the pulse generator;
- associated storages which are coupled to the coincidence stages;
- a source of incoming signals;
- a receiving trigger which in response to the incoming signal changes the directional stage into a position predetermined for the signal reception, and which triggers a clock pulse eliminator for starting both the clock-pulse generator and frequency divider; and
- said coincidence stages, in the receiving state and in rhythm with the incoming signal elements, transmit pulses which mark the respective storage or couple the pulse to ground,
- said coincidence stages transmit in addition a keying pulse which, depending on the assumed position of the associated storage, controls a transmitter keying stage or its coupled to ground, and
- said directional stage is controlled by the respective operating condition such that an incoming start element switches it into the receive position and the actuation of a transmitter tripping contact switches it into the transmit position.

2. An arrangement according to claim 1, including transmitting contacts which are actuated to effect direct marking of said storages and actuation of said tripping contact.

3. An arrangement according to claim 1 in which:
said directional stage when in the receiving position causes said keying stage to be non-conducting, and
said directional stage when in the transmitting position causes a testing stage, which is coupled between the directional stage and the coincidence stages, to couple the storage marker lines to ground.

4. An arrangement according to claim 3, wherein said test stage, in the middle of each keying pulse, is temporarily rendered ineffective by the clock-pulse generator, and that during the time it is ineffective, marking pulses are applied to said storages in accordance with the potential momentarily prevailing on the incoming line.

5. An arrangement according to claim 1, in which said coincidence stages successively transmit two parallel pulses, and depending on the potential prevailing on the teleprinter line, one of said two pulses marks the associated storage and the other pulse is coupled to ground via a sensing stage.

6. An arrangement according to claim 5, including another coincidence stage coupled to the dual counter and adapted so that the coincidence established by the stop element of each signal causes said keying stage to return to a normal condition, and said other coincidence stage suppresses said clock-pulse generator and effects the tripping of a printing mechanism.

7. An arrangement according to claim 6, wherein one output from said other coincidence stage triggers a univibrator which effects the tripping of the printing mechanism.

8. An arrangement according to claim 6, wherein said other coincidence stage is switched, by the actuation of a repeat key, from its normal position to position which release the clock-pulse generator, and said dual counter is stepped-on so that the timing adhered to is one and a half times the length of the stop element.

9. An arrangement according to claim 2, including electronic input devices, the outputs of which are connected to said associated storages.

References Cited

UNITED STATES PATENTS

| | | |
|---|---|---|
| 2,635,229 | 4/1953 | Gloess et al. |
| 3,005,871 | 10/1961 | Rudolph. |
| 3,294,908 | 12/1966 | Schiebeler. |

THOMAS A. ROBINSON, *Primary Examiner.*

U.S. Cl. X.R.

178—17, 88